Sept. 15, 1970
E. H. SCHWARTZMAN
3,528,289
FLOWMETER APPARATUS
Original Filed Feb. 23, 1965
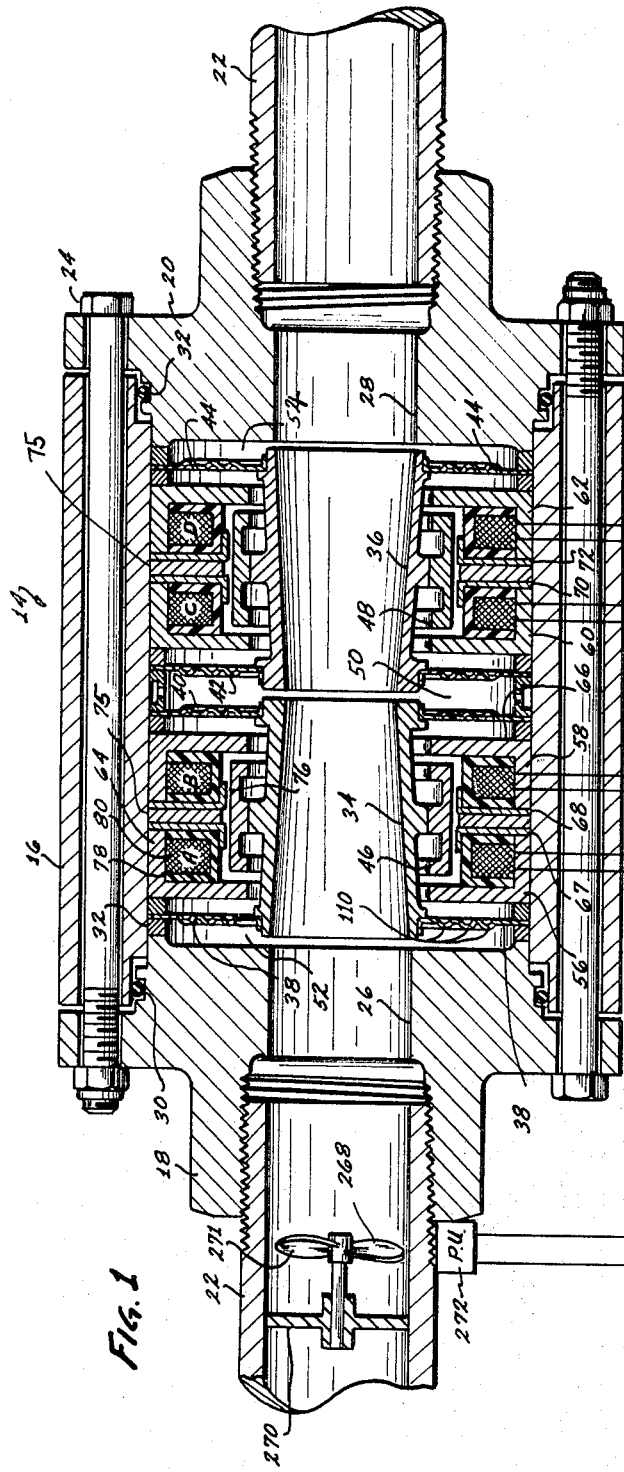
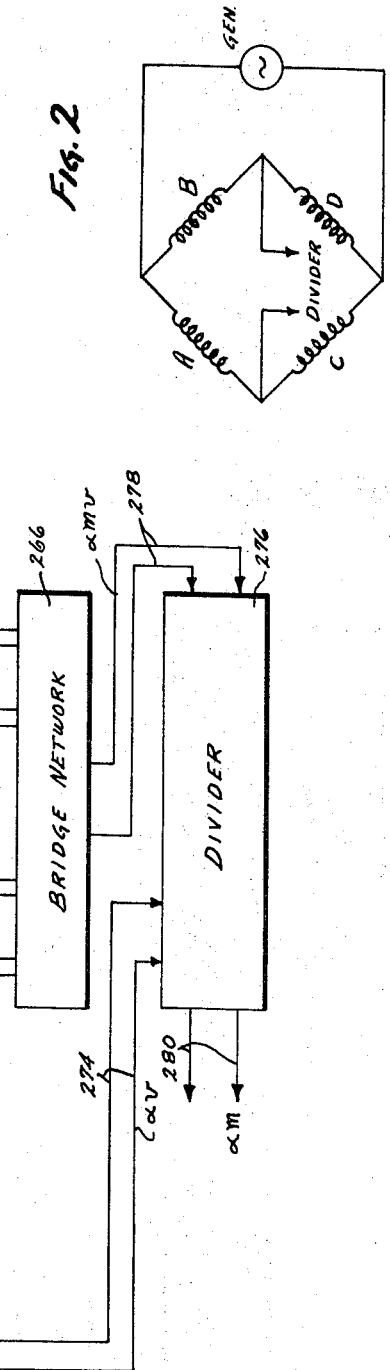
INVENTOR
EVERETT H. SCHWARTZMAN
BY Nilsson + Robbins
ATTORNEYS United States Patent Office 3,528,289
Patented Sept. 15, 1970

3,528,289
FLOWMETER APPARATUS
Everett H. Schwartzman, 457 34th St.,
Manhattan Beach, Calif. 90266
Original application Feb. 23, 1965, Ser. No. 434,179, now
Patent No. 3,374,674, dated Mar. 26, 1968. Divided and
this application Feb. 28, 1968, Ser. No. 708,971
Int. Cl. G01p 5/14
U.S. Cl. 73—213                                10 Claims

ABSTRACT OF THE DISCLOSURE

A fluid-flow metering structure is disclosed which functions as a true mass meter, providing an electrical signal that is proportional to the mass flow per unit of time in a stream through a conduit containing the structure. As disclosed, an outer hollow cylindrical body encloses a pair of venturi members that are resiliently supported for axial movement. The venturi members are supported with their internal tapers opposed so that as the flow varies, the related Bernouli effect variously displaces them. Such axial movement displaces paramagnetic pistons carried on the venturi members, which in turn affects a magnetic electric network to provide a signal indicative of mass rate of flow times the fluid velocity. The true mass rate of flow is then obtained, essentially by developing a signal representative of the fluid velocity and performing a division operation, e.g. $Mv/v=M$. Structurally, in the disclosed embodiment, a magnetic propeller device is provided in cooperation with a magnetic pickup to provide a signal that is proportional to the fluid velocity. An analog divider then performs the electrical division to accomplish an output representative of mass flow.

BACKGROUND AND SUMMARY OF THE INVENTION

This is a divisional of applicants co-pending United States patent application, Ser. No. 434,179, now Pat. No. 3,374,674 filed Feb. 23, 1965 and entitled Fluid Flowmeter. The subject matter hereof is specifically directed to a mass flowmeter. The subject matter of this case includes no new material and in that regard the system presented herein represents structure as collectively disclosed in FIGS. 1, 4 and 12 of applicant's prior case as identified above.

Transducers heretofore available have provided measurements which are subject to errors due to non-constant characteristics of the fluid such as its velocity, density, thermo-conductivity or the like. In addition, the instruments are typically mechanically unstable, fragile, or bulky or are costly and require complex electrical circuitry to compensate for their inherent non-linearity. Furthermore, the prior art transducers are generally incapable of insertion into a chemically active (e.g. acid) flow. In addition, they are typically gravity sensitive, requiring that they be placed and maintained in a particular orientation with respect to the direction of the field of gravity and are acceleration sensitive causing their electrical output to be spurious whenever the transducer is subjected to mechanical shock or other acceleration of the unit or its component parts. The invention as disclosed includes a pair of closely spaced, axially aligned, hollow cylindrical armature members which are internally tapered whereby their contiguous ends have a smaller diameter, in this example, than their opposite ends. The armature members may be metal and are supported at each of their ends by annular, flexible metal diaphragms. The in-register bores of the diaphragms and armature members define the path of the fluid flow through the sensor; and the combined tapered bores form a venturi having a reduced diameter region near the axial mid-point of the combined armature members. The reduced diameter portion is coupled to the annular volume between the two juxtaposed center diaphragms while fluid pressures in the enlarged diameter end portions of the venturi are coupled to the outer surface of each of the outer supporting diaphragms. Thus, when the fluids are passed through the combined tapered bores of the sensor, the pressure and consequent outward axial forces on the central diaphragms are less than that exerted axially inwardly on the outer diaphragms by a net force which depends on the velocity of the fluid. Consequently, the armature members are displaced axially toward each other against the retaining, restoring forces of their supporting diaphragms, by a displacement, the magnitude of which is indicative of the velocity and specifically is a measure of the product of the fluids mass and velocity.

Each of the armature members may carry a paramagnetic ring or ferrule which constitutes an element of a magnetic circuit separated from other reluctance elements thereof by an air gap, the instantaneous reluctance or gap dimension of which is determined by the axial position of the ferrule which is in turn carried by its respective armature member.

Electrical circuitry is provided in cooperation with the structure of the above example to provide a desired signal. For example, four sensing coils may be connected in a detecting bridge whereby displacement or motions of the armatures due to other than venturi effects are electrically cancelled out. Such non-venturi displacements may be due for example, to viscous drag effects of the fluid flow, acceleration of the meter environment, differential thermal strains and the like. A corollary advantage of this type of mechanical-electrical network is that the sensitivity of the sensing mechanism is vastly increased, over what it would otherwise be, due to the push-pull technique utilized in the network. The mass rate of flow is obtained by dividing (electrically) the output described above by a signal indicative of velocity.

BRIEF DESCRIPTION OF THE DRAWINGS

FIG. 1 is a longitudinal sectional view of an example of an electromagnetic flowmeter apparatus constructed in accordance with the principles of the present invention; and FIG. 2 is a schematic diagram illustrating a generalized example of electrical circuitry utilized in cooperation with the structure of the earlier figure.

DETAILED DESCRIPTION OF THE ILLUSTRATIVE EMBODIMENT

With specific reference now to the figures in more detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention, the description taken with the drawings making apparent to those skilled in the art and technology of flowmeters how the several forms of the invention may be embodied in practice. Specifically, the detailed showing is not to be taken as a limitation upon the scope of the invention which is defined by the appended claims forming along with the drawings, a part of this specification.

Referring to FIG. 1, an example of a flowmeter 14 is illustrated which includes a central outer hollow cylindrical body portion 16 and a pair of enclosing end members 18, 20. The end members are shown joined to external system piping 22 as by conventional threaded joining. The end members 18, 20 are axially compressively joined to the central body portion 16 by a series of tension supporting, peripherally distributed, axially oriented assembly bolts 24. The resulting confined volume within the body portion 16 and the end members 18, 20 forms what may be termed a series conduit body which communicates with the external system piping 22 through axial ports 26, 28 provided respectively through the end members 18, 20 in register with the threaded connections for the external piping. Sealing O-rings 30, 32 housed within appropriate retaining channels may be provided for hermetically sealing the assembly together while at the same time providing ready disassembly for access to sensing elements housed within the assembly.

The flowmeter sensing elements comprise a pair of venturi members 34, 36 which are supported concentrically within the central body portion 16 coaxially therewith and, with a degree of resilient axial motion, by annular diaphragms 38, 40, 42, 44. The former two are disposed one each at either end of the venturi member 34 while the latter two are disposed supportingly at either end of the venturi member 36. The venturi members are formed of a generally low inertia structure which in this example is tubular aluminum with a larger inner diameter at each of their outer extremities, that is, contiguously to the end members 18, 20; and with a smaller inner diameter near an axial central plane of symmetry from which the venturi members are each slightly axially spaced and about which they are disposed in mirror image symmetry. Each of the venturi members carries a paramagnetic toroidal piston 46, 48 secured about the periphery of the central portion of each of the respective venturi members concentrically with the axis of the system.

In operation, very briefly, fluid flow through the conduit system along the axis of the structure shown in FIG. 1, causes, by Bernouli effect, a decreased pressure in the annular space 50, between the symmetric halves of the unit, with respect to that existent in the annular chambers 52, 54 at the ends of the unit between the respective venturi members and the end members 18, 20. This decreased pressure, the magnitude of which is an indication of the rate of flow along the axis of the system permits, or causes, an axial displacement of each of the venturi members toward the plane of symmetry at the center of the device. This axial motion causes a corresponding displacement of the paramagnetic pistons 46, 48 which in turn affects a magnetic-electric network in a manner to be described in more detail below.

The remainder of the magnetic circuit housed within the body of the flowmeter 14 includes, in this example, four paramagnetic cup members 56, 58, 60, 62. Each of the cup members includes an outer rim portion 64 and an annulus portion 66 which is centrally ported to provide clearance for the venturi members and which is joined at its outer periphery to one end of the rim portion 64. The cup members are arranged in pairs symmetrically about each of the paramagnetic pistons, 46, 48 with concave configurations being juxtaposed toward each other. Disposed symmetrically within each of the juxtaposed pair of cup members is a symmetrically arranged second pair of paramagnetic members 67, 68, 70, 72 which each comprise an annulus portion 74 joined with an inner rim portion 76. The pair of the paramagnetic members 67, 68, 70, 72 are arranged with their annulus portions juxtaposed and in contact at their outer peripheries with a respective one of the paramagnetic cup members 56, 58, 60, 62 and with their inner rim portions 76 projecting axially toward a respective one of the annulus portions 66 of the cup members. The end of the inner rim portion 76 does not contact the annulus portion 66 of the cup members but is axially spaced therefrom to form a high reluctance gap in the otherwise permeable loop around the toroidal cross-section formed by the cup members and the paramagnetic members 67, 68, 70, 72. The inner cylindrical surface of the rim portions 76 is each radially juxtaposed with respect to the outer cylindrical surface of a portion of a respective one of the paramagnetic pistons 46, 48. As may then be seen from the figure, axial motion of the venturi members increases or decreases the axial length of the effective high-reluctance gap in the magnetic loops formed by the cup members, the paramagnetic members 67, 68, 70, 72, and the paramagnetic pistons 46, 48.

A toroidal spool 78 wound with a sensing coil 80 is interposed within each of the magnetic toroids just described. These coils are additionally labeled A, B, C and D for ready correlation with certain of the subsequent circuit diagrams.

In the assembly of the end members 18, 20, the central body portion 16, and the paramagnetic sensing elements and diaphragm members within the body portion, a series of spacing rings are disposed in a stacking manner with the other elements in a manner to determine and secure the desired axial relationships therebetween. It may be noted that the spacing rings are all relatively radially thin except for those compressively juxtaposed between the annulus portions 75 of the paramagnetic members 67, 68, 70, 72. These latter spacing rings may have a radial dimension substantially equal to that of annulus portion of pistons 64.

The individual coils A, B, C and D are connected to a bridge circuit 266, which is in turn connected to a divider 276. In FIG. 2, a schematic diagram of an example of a flowmeter sensing circuit is illustrated in which the four sensing coils 80 (coil A, coil B, coil C, and coil D) are connected in a bridge circuit with the coils connected in a loop ABDCA, clockwise as shown in the figure, with an alternating current generator connected between the opposite points at the junction between coils A and B and the junction between the coils C and D, and with output terminals to the divider 276 connected between the other opposite loop points; that is, between coils A and C and between coils B and D.

In operation it may be seen that initially the bridge may be balanced if the inductive reactance of each of the coils is equal. In this event, there would be no output current. It may also be seen that when the venturis are moved in the same direction as by vibration or acceleration effects, the changes in inductive reactance cancel and the bridge remains balanced. When, however, the fluid is forced through the venturi members, they are displaced axially toward each other causing the inductive reactance of coils B and C to be lowered while that of coils A and D is increased. Thusly, the bridge network is unbalanced in a push-pull fashion so that current from the alternating current generator flows predominantly through coils B and C, effectively in series with the output terminals while less current flows through the coils A and D. The magnitude of unbalance of the bridge network and consequenly the level of current through the output terminals is clearly indicative of fluid flow through the flowmeter 14.

It may be seen that, typically, the specific object when measuring fluid flow is to obtain the mass rate of flow (M), i.e. mass per unit of time of the gas or liquid past a given point. For incompressible fluids, the density (mass per unit of volume) may be assumed to be constant, ignoring second order temperature and pressure effects.

The electrical output of the bridge circuit 266 is generally proportional to the mass rate of flow times the fluid velocity (Mv). Thus, the mass rate of flow may be obtained by dividing, electrically this quantity by the velocity v. This may be accomplished by the structure illustrated. However, the mass rate of flow may also be obtained by taking the square root of the quantiy Mv, since from the continuity equation ($M = \rho g v A$, where $\rho g$ is the fluid density, and A is the cross sectional area of the fluid conduit at the point of observation)

$$v = M/\rho g A$$

and by substitution $Mv$ (the meter output) $= M^2/\rho g A = KM^2$ where K is a constant for an incompressible fluid. A standard, shelf unit is then used to operate electrically on the flowmeter output to obtain the quantity M.

For compressible fluids, $M^2/\rho g A$ of MV is the quantity manifest by the flowmeter output signal, where M is mass in pounds per second and V is velocity in feet per second. As a related consideration, the continuity equation $M = \rho g V A$, where $\rho g$ is the density in pounds per cubic foot and A is area (cross-sectional) in square feet, is pertinent. As the flowmeter senses $M^2/\rho g A$, by dividing, first by A, then by $\rho g$, the quantity $M^2$ is obtained, the square root of which is the desired quantity.

However, as disclosed, the present system provides what is termed a true mass meter by which is denoted a transducer system which provides an electrical signal output which is proportional to the mass flow per unit time through the conduit of the system for substantially all fluids including compressible fluids. To this end a propeller device 268 is mounted on a strut apparatus 270. At least one of the blades of the propeller device is fabricated of magnetic material 271 or includes a magnet or magnetic material insert in one or more of the blades. A magnetic or variable reluctance pick-up transducer 272 is mounted on the external wall of the conduit of the system in magnetic interaction relationship with the magnetic material in the propeller device 268. The signal output of the transducer 272 is, for all fluids including compressible fluid, substantially directly proportional to the velocity of the fluid through the conduit of the system. The signal output is impressed through the leads 274 to one input of the dividing network 276 while the output signal from the bridge network 266, which is proportional to the mass flow times the velocity, is impressed through the leads 278 onto a second input terminal of the dividing network 276. The network 276 may be a conventional dividing network which divides the bridge network signal by the pick-up transducer 272 signal and obtains at its output terminals 280, an output signal which is directly proportional to the true mass rate of flow through the conduit of the system.

Another example of the invention, not specifically depicted, comprises a cylindrical housing body 16 such as illustrated in FIG. 1, for example, but which instead of being coupled to system piping 22, is suspended on rigid struts within a fluid conveyor of relatively much larger diamter than that of the housing body portion 16 of the flowmeter 14. The fluid then flows over the external surfaces of the flowmeter as well as throughth the axial apertures in the end members 18, 22. The meter operates exactly as in other embodiments discussed above except that a straight forward correction is made in the electric or mechanical apparatus for the proportionally, and somewhat smaller, velocity through the flowmeter as compared with the velocity of flow around the meter.

There has thus been disclosed and described a number of examples of an electromagnetic flowmeter system and method according to the present invention which exhibit the advantages and achieve the objects set forth hereinabove.

What is claimed is:

1. A meter structure for measuring fluid flow in a stream, comprising:

first and second venturi members, defining flow channels varying from a larger sectional dimension to provide internal tapers;

support means for flexibly supporting said first and second venturi members to pass said stream, said first and second venturi members being supported to position the internal taper of said first venturi member in opposing relationship to the internal taper of said second venturi member;

means for sensing displacement of said first and second venturi members as a first signal;

means for sensing the velocity of said stream as a second signal;

and means for combining said first signal and said second signal to provide an output signal.

2. A meter structure according to claim 1 wherein said first and second venturi members are independently supported in spaced-apart relationship by said support means.

3. A meter structure according to claim 1 wherein said means for sensing the velocity of said stream includes a propeller means and means for sensing the rate of rotation of said propeller means as an indication of the velocity of fluid in said stream.

4. A meter structure according to claim 1 wherein said means for combining said first signal and said second signal comprises an electrical dividing network for providing an output that is proportional to the value represented by said first signal divided by the quantity represented by said second signal.

5. A meter structure according to claim 1 wherein said means for sensing displacement of said first and second venturi members as a first signal includes a plurality of electrical coils and means connecting said coils in a bridge circuit.

6. A meter structure according to claim 1 wherein said support means includes diaphragm means for independently supporting said first and second venturi members, spaced apart in opposing relationship and whereby said venturi members are operationally displaced solely by said fluid stream.

7. A meter structure according to claim 6, wherein said means for sensing the velocity of said stream includes a propeller means and means for sensing the rate or rotation of said propeller means as an indication of the velocity of fluid in said stream.

8. A meter structure according to claim 7, wherein said means for combining said first signal and said second signal comprises an electrical dividing network for providing an output that is proportional to the value represented by said first signal divided by the quantity represented by said second signal.

9. A meter structure according to claim 7, wherein said means for sensing displacement of said first and second venturi members as a first signal includes a plurality of electrical coils and means connecting said coils in a bridge circuit.

10. A meter structure according to claim 8, wherein said means for sensing the displacement of said first and second venturi members as manifest by a first signal, includes a plurality of electrical coils and means connecting said coils in a bridge circuit.

References Cited

UNITED STATES PATENTS

| | | | |
|---|---|---|---|
| 2,769,337 | 11/1956 | Rich | 73—211 X |
| 3,251,226 | 5/1966 | Cushing | 73—213 X |

RICHARD C. QUEISSER, Primary Examiner

A. E. KORKOSZ, Assistant Examiner

U.S. Cl. X.R.

73—231